L. M. PETTIT.
SAW SET.
APPLICATION FILED SEPT. 9, 1912.
1,059,066.
Patented Apr. 15, 1913.
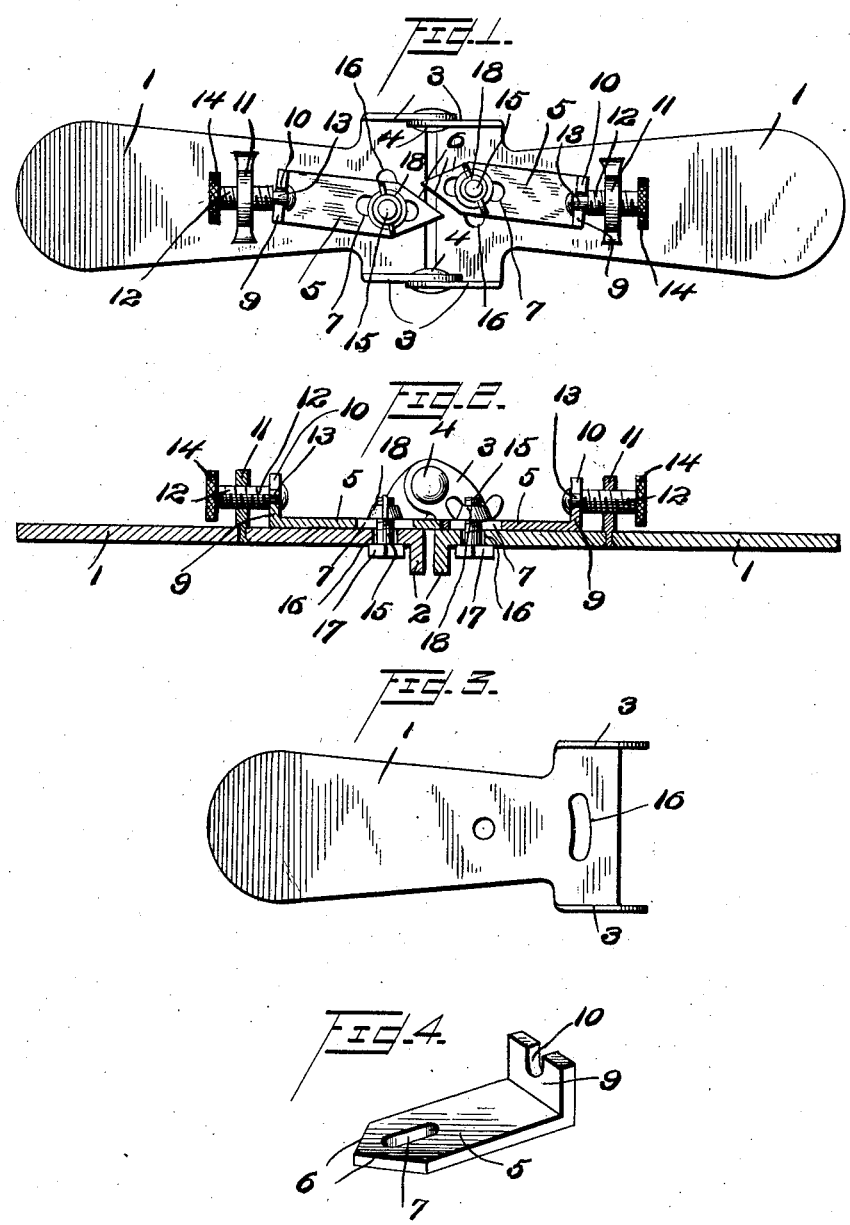
Witnesses
H. Strauss
R. H. Krenkel
Inventor
Lewis M. Pettit
By Joshua R. H. Potts
Attorney

UNITED STATES PATENT OFFICE.

LEWIS M. PETTIT, OF PENNS GROVE, NEW JERSEY.

SAW-SET.

1,059,066.  Specification of Letters Patent.  Patented Apr. 15, 1913.

Application filed September 9, 1912. Serial No. 719,304.

*To all whom it may concern:*

Be it known that I, LEWIS M. PETTIT, a citizen of the United States, residing at Penns Grove, in the county of Salem and State of New Jersey, have invented certain new and useful Improvements in Saw-Sets, of which the following is a specification.

My invention relates to improvements in saw sets, the object of the invention being to provide an improved device of this character comprising two members hinged together having saw engaging tongues thereon and provided with adjustable beveled blades on their upper face, whereby teeth may be quickly and accurately set at any desired angle.

A further object is to provide a device of this character which is of extreme simplicity and which may be manufactured and sold at a reasonably low price.

With these and other objects in view, the invention consists in certain novel features of construction and combinations and arrangements of parts, as will be more fully hereinafter described and pointed out in the claims.

In the accompanying drawings: Figure 1 is a plan view illustrating my improved saw set. Fig. 2 is a view in longitudinal section through the center of Fig. 1. Fig. 3 is a plan view of one of the members detached, and Fig. 4 is a perspective view of one of the blades.

My improved saw set comprises two members 1, 1, which are formed on one face with integral tongues 2, 2, to clamp the saw blade between them and on the opposite face of said members, at their outer edges, they are provided with perforated ears 3 for the reception of rivets 4 which pivotally secure the members together as clearly shown.

For clearness of description, I shall refer to that face of the saw set which contains the tongues 2 as the lower face and the other face of said saw set the upper face.

On the upper face of the members 1, 1, blades 5, 5, are secured and these blades 5, 5, have beveled or V-shaped ends 6 which are adapted to project across the space between the two members and bend the teeth of the saw. These blades 5, 5, are each provided with a longitudinal slot 7, and the rear end of each blade is formed with an upwardly projecting flange 9 having a central recess 10 therein. Posts 11 are secured in the members 1 in rear of the blades 5.

Screws 12 engage in threaded openings in the posts 11 and are provided with annular recesses 13 at their ends which are positioned in the recesses 10 of flanges 9, so that when the screws are turned they will compel the blades to move longitudinally. Suitable heads 14 are provided on the outer ends of the screws 12 to facilitate their turning movement.

Bolts 15 project through curved slots 16 in the members 1, and through the slots 7 in blades 5. These bolts 15 have heads 17 on their lower ends and are provided with wing nuts 18 on their upper ends engaging the blades 5. It will thus be seen that when these wing nuts 18 are loosened, the blades 5 may be swung laterally so as to position their beveled ends at any desired distance apart and at any desired angle to each other. Furthermore, the blades may be adjusted longitudinally by means of the screws 13, so that these blades may be positioned on the members 1 in exact accordance with the set of the saw teeth. When they are properly adjusted, they are secured by tightening the wing nuts 18 and by opening and closing the members on the saw and moving it along the teeth of the saw, the teeth may all be set alike and the operation may be quickly and easily performed.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A saw set, comprising two members which when in operative position are substantially in alinement upwardly projecting ears on the upper faces of said members at their inner ends pivotally secured together, whereby the pivotal point of the set is above the members, downwardly projecting saw gripping tongues on the members at their adjacent ends, and adjustable blades on the upper face of the members adapted to engage the saw teeth when the tongues grip the opposite sides of the saw, substantially as described.

2. A saw set, comprising two members which when in operative position are substantially in alinement, upwardly projecting ears on the upper faces of said members at their inner ends pivotally secured together, whereby the pivotal point of the set is above the members, downwardly projecting saw gripping tongues on the members at their adjacent ends, adjustable blades on the upper face of the members adapted to engage the saw teeth when the tongues grip the opposite sides of the saw, and means for securing said blades at different longitudinal and lateral adjustments, substantially as described.

3. A saw set, comprising two members which when in operative position are substantially in alinement, upwardly projecting ears on the upper faces of said members at their inner ends pivotally secured together, whereby the pivotal point of the set is above the members, downwardly projecting saw gripping tongues on the members at their adjacent ends, adjustable blades on the upper face of the members adapted to engage the saw teeth when the tongues grip the opposite sides of the saw, means for securing said blades at different longitudinal and lateral adjustments, said longitudinally adjustable means comprising screws having rotary mounting at one end in the blades, and threaded engagements between their ends with fixed parts of the members, said lateral adjusting means comprising a bolt projected through longitudinal slots in the blades and lateral slots in the members, and nuts securing said bolts, substantially as described.

4. A saw set comprising two members hinged together, tongues on one side of said members adapted to grip the saw, blades on the opposite faces of said members, said blades having two longitudinal slots therein, flanges on the outer ends of said blades having recesses therein, posts in the members projecting through slots in the blades, and having screw-threaded openings therethrough, screws engaging the threads in said openings, and having reduced portions positioned in the notches in the flanges, said members having laterally positioned slots therein, bolts projected through said laterally positioned slots and through the slots in the blades, and thumb nuts on said bolts, substantially as described.

In testimony whereof I have signed my name to this specification in the presence of two subscribing witnesses.

LEWIS M. PETTIT.

Witnesses:
WILLIAM A. SUMMERILL,
SIMON CUNNINGHAM.

---

Copies of this patent may be obtained for five cents each, by addressing the "Commissioner of Patents, Washington, D. C."